United States Patent [19]
Patterson

[11] 4,026,688
[45] May 31, 1977

[54] EXHAUST VENT FILTER

[75] Inventor: Ray Patterson, Naples, Fla.

[73] Assignee: The Raymond Lee Organization, Inc., New York, N.Y.

[22] Filed: June 4, 1976

[21] Appl. No.: 692,679

[52] U.S. Cl. ................................. 55/309; 55/316; 55/385 R; 55/387; 55/486; 55/DIG. 30; 110/119; 23/284
[51] Int. Cl.² ....................................... B01D 46/42
[58] Field of Search ............. 110/119; 55/309–314, 55/316, 385 R, 387, 486, DIG. 30; 23/284

[56] References Cited

UNITED STATES PATENTS

| | | | |
|---|---|---|---|
| 1,921,943 | 8/1933 | Rice | 220/372 |
| 2,575,483 | 11/1957 | Bethig | 55/316 |
| 3,129,078 | 4/1964 | Hobbs | 55/DIG. 30 |
| 3,638,402 | 2/1972 | Thomas | 55/310 |
| 3,744,976 | 7/1973 | Tongue | 55/316 |
| 3,783,590 | 1/1974 | Allen | 55/313 |

*Primary Examiner*—Bernard Nozick
*Attorney, Agent, or Firm*—Stephen Wyden

[57] ABSTRACT

A stack of filters mounted on a relief vent mounted in a retaining collar, the retaining collar mounted in a hood on a stack pipe attached to an exhaust vent in order to filter the exhaust gases entering the atmosphere.

3 Claims, 2 Drawing Figures

EXHAUST VENT FILTER

I have invented a new and novel exhaust vent filter to prevent fouling of the air with noxious exhaust gases. For a small expense people can hereby contribute to the cleanliness of the air.

My invention can be understood in view of the accompanying figures.

Figure 1:
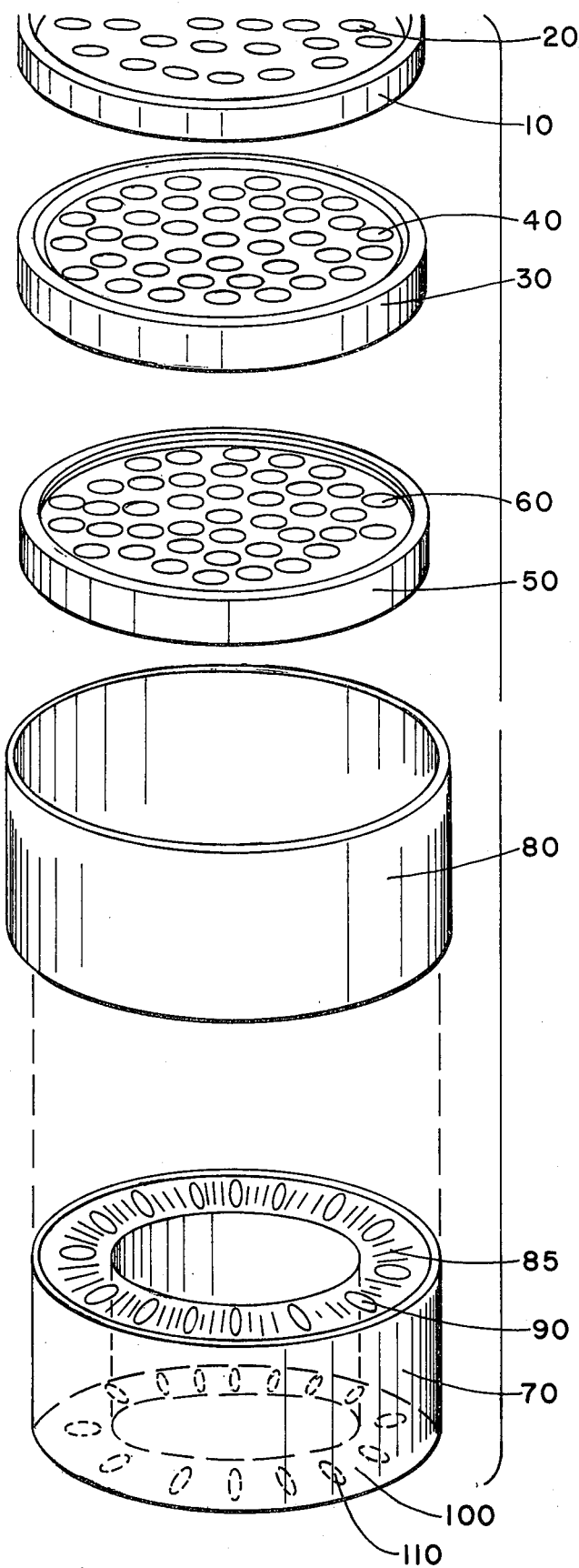
FIG. 1 shows the insert that collects the noxious gases.

In FIG. 1, a top filter disc 10 containing charcoal 20 is mounted over a second filter disc 30 containing soda lime or alcolime 40 which is over a third filter disc 50 containing either sodium bisulfate or sodium hydroxide 60, depending on the application, and a relief vent 70 is mounted under the filters in a retaining collar 80. The relief vent 70 acts as a reducer to the size of an exhaust vent pipe. The relief vent 70 has an upper inwardly sloping ridge 85 with perforations 90 and a lower inwardly sloping ridge 100 in phantom, with perforations 110. The relief vent 70 permits the escape of exhaust gases through the bottom holes 110 if the stack of filters 10, 30, and 50 become dogged or otherwise block exhaust of gases.

Figure 2:
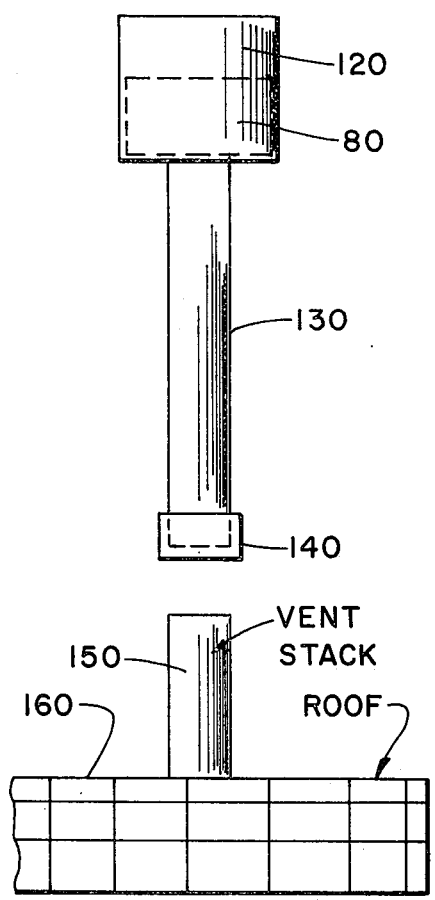
FIG. 2 shows the insert installed on an exhaust stack.

In FIG. 2, the stack of filters and relief vent in the retaining collar 80, in phantom, is mounted in a hood 120 to prevent snow or ice from clogging the filter. The Hood 120 is mounted on a stack pipe 130 connected by a couple 140 to the existing vent stack 150 coming out of the roof 160.

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:

1. An exhaust vent filter, mountable on an existing vent stack, comprising:
    a stack pipe connected to the existing vent stack,
    a hood mounted on the stack pipe,
    a retaining collar mounted in the hood,
    a relief vent (70) mounted in the retaining collar, and
    a stack of filters mounted on the relief vent.

2. The relief vent (70) of claim 1, wherein the relief vent forms an upper inwardly sloping ridge, said ridge forming a plurality of perforations, and the relief vent forming a lower inwardly sloping ridge, and said ridge forming a plurality of perforations, whereby exhaust gases may escape through the perforations when the stack of filters becomes clogged.

3. The stack of filters of claim 1, further comprising:
    a top filter disc containing charcoal,
    a second filter disc containing a material chosen from among soda lime and alcolime, mounted under the top filter, and
    a third filter disc containing a material chosen from among sodium bisulfate and sodium hydroxide, mounted under the second filter and on the relief vent (70).

* * * * *